(12) United States Patent
Goldfarb et al.

(10) Patent No.: US 9,135,630 B2
(45) Date of Patent: Sep. 15, 2015

(54) SYSTEMS AND METHODS FOR LARGE-SCALE LINK ANALYSIS

(75) Inventors: Eithan Goldfarb, Ness Ziona (IL); Gabby Shainer, Hod Hasharon (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 88 days.

(21) Appl. No.: 12/888,445

(22) Filed: Sep. 23, 2010

(65) Prior Publication Data

US 2011/0131208 A1 Jun. 2, 2011

(30) Foreign Application Priority Data

Sep. 23, 2009 (IL) .......................................... 201130

(51) Int. Cl.
*G06F 17/30* (2006.01)
*G06Q 30/02* (2012.01)

(52) U.S. Cl.
CPC .......... *G06Q 30/02* (2013.01); *G06F 17/30867* (2013.01)

(58) Field of Classification Search
CPC . G06Q 50/01; G06Q 10/063; G06Q 10/0637; G06Q 30/0261; G06Q 10/063114; G06Q 30/0254; G06Q 30/02; H04L 67/22; H04L 43/04; H04L 43/12; H04L 63/14; H04L 63/1425; H04L 63/1433; G06F 21/00; G06F 17/30705; G06F 17/30958; G06F 17/30867
USPC ......... 707/722, 736, 748, 752, 756, 758, 769, 707/802, E17.044, 776
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,277,532 B2* | 10/2007 | Locke et al. | 379/112.01 |
| 7,466,816 B2 | 12/2008 | Blair | |
| RE40,634 E | 2/2009 | Blair et al. | |
| 7,577,131 B2* | 8/2009 | Joseph et al. | 370/351 |
| 7,580,947 B2* | 8/2009 | Kasravi et al. | 1/1 |
| 7,587,041 B2 | 9/2009 | Blair | |

(Continued)

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

(Continued)

*Primary Examiner* — Jean B Fleurantin
*Assistant Examiner* — Evan Aspinwall
(74) *Attorney, Agent, or Firm* — Meunier Carlin & Curfman

(57) ABSTRACT

Systems and methods for accepting relationship indications based on interaction among entities, where each relationship indication specifies that a respective pair of the entities may be related. A single entity record may be constructed that indicates all the linked entities that have been identified as being related to the entity. The entities may include an individual, a set of individuals, a communication terminal, a plurality of communication terminals, an organization, an e-mail address, a Web-site, a bank account and a home address. An analytics operation may performed, such as identifying a shortest sequence of interrelated entities that relate a first entity with a second entity, and acting upon the identified sequence.

17 Claims, 2 Drawing Sheets

(56) References Cited

U.S. PATENT DOCUMENTS

| | | | |
|---|---|---|---|
| 7,593,909 B2* | 9/2009 | Kasravi | 706/45 |
| 7,796,529 B2* | 9/2010 | McLane et al. | 370/248 |
| 7,801,843 B2* | 9/2010 | Kumar et al. | 706/61 |
| 7,805,457 B1* | 9/2010 | Viola et al. | 707/769 |
| 7,818,392 B1* | 10/2010 | Martino et al. | 709/217 |
| 7,843,835 B2* | 11/2010 | Yurchenko | 370/241 |
| 2006/0265748 A1* | 11/2006 | Potok | 726/23 |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2009/0192809 A1* | 7/2009 | Chakraborty et al. | 705/1 |
| 2010/0100494 A1* | 4/2010 | Polo-Malouvier et al. | 705/319 |
| 2010/0235223 A1* | 9/2010 | Lyman | 705/10 |
| 2011/0029887 A1* | 2/2011 | Pearson et al. | 715/743 |
| 2011/0225158 A1* | 9/2011 | Snyder et al. | 707/737 |

OTHER PUBLICATIONS

Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "R&S RA-CM Continuous Monitoring Software," Product Brochure, Radiomonitoring & Radiolocation, Jan. 2001, 16 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Fox Replay BV, "FoxReplay Analyst," http//www.foxreplay.com, Revision 1.0, Nov. 2007, 5 pages.
Aho, Alfred V., et al., "Efficient String Matching: An Aid to Bibliographic Search," Communication of the ACM, Jun. 1975, vol. 18, No. 6, pp. 333-340.
Coffman, T., et al., "Graph-Based Technologies for Intelligence Analysis," CACM, Mar. 2004, 12 pages.
Verint Systems Inc., "Mass Link Analysis: Solution Description," Dec. 2008, 16 pages.
High-Performance LI with Deep Packet Inspection on Commodity Hardware, ISS World, Singapore, Jun. 9-11, 2008, Presenter: Klaus Mochalski, CEO, ipoque, 25 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Schulzrinne, H., et al., "RTP: A Transport Protocol for Real-Time Applications," Standards Track, Jul. 2003, 89 pages.
Sheng, Lei, "A Graph Query Language and Its Query Processing," IEEE, Apr. 1999, pp. 572-581.
Tongaonkar, Alok S., "Fast Pattern-Matching Techniquest for Packet Filtering," Stony Brook University, May 2004, 44 pages.
Yu, Fang, et al., "Fast and Memory-Efficient Regular Expression Matching for Deep Packet Inspection," ANCS'06, Dec. 3-5, 2006, San Jose, California, 10 pages.

* cited by examiner

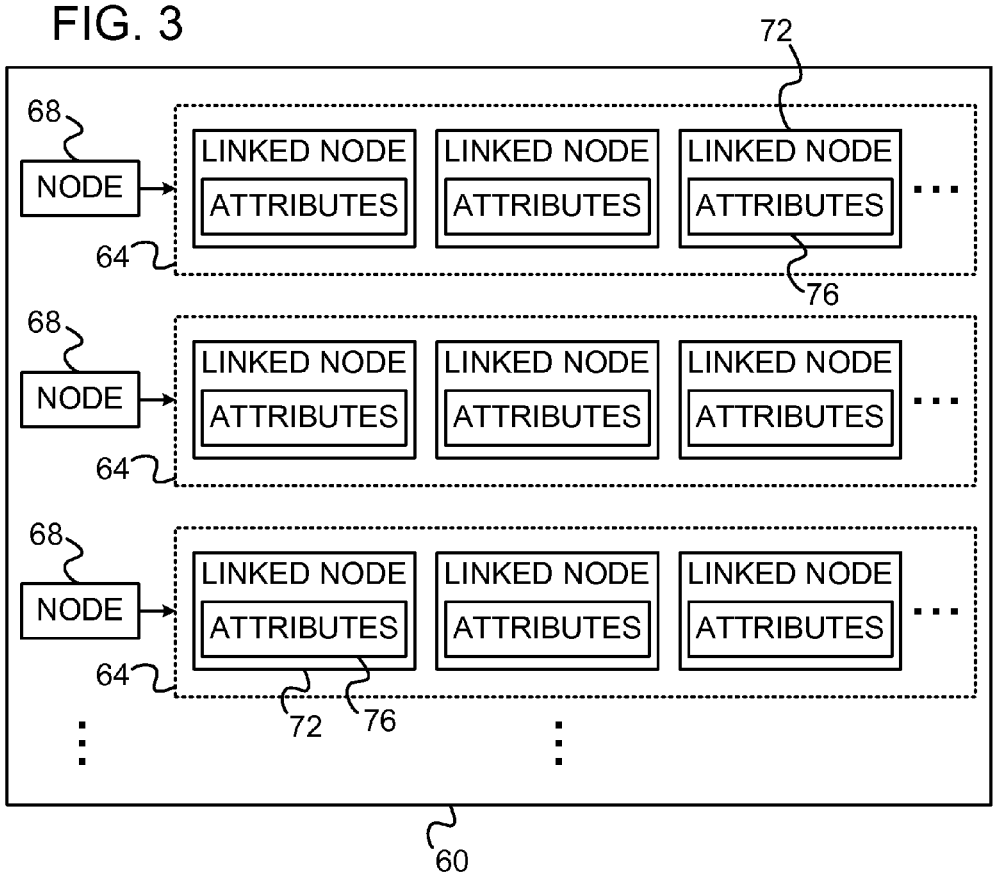
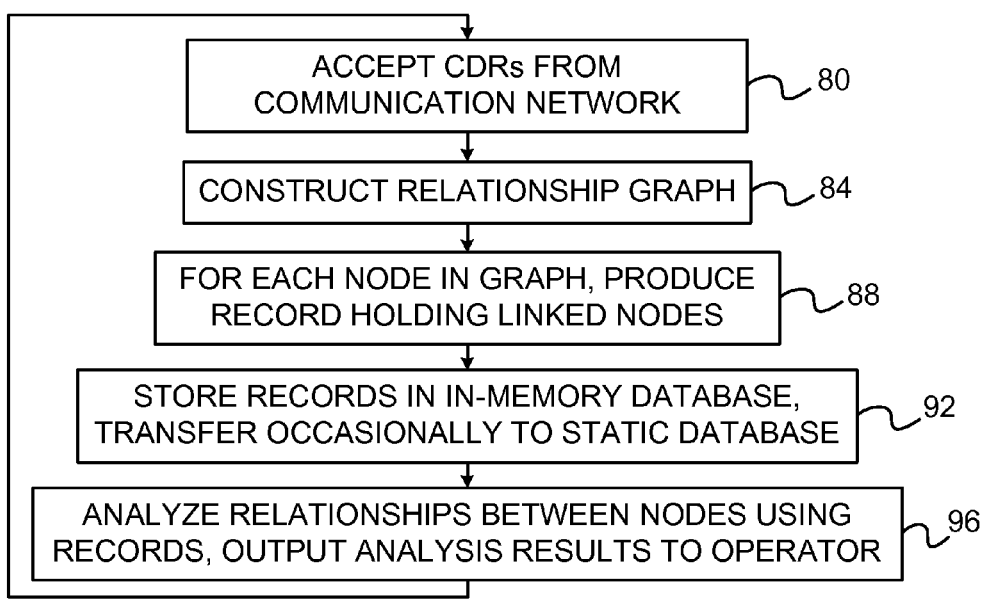

SYSTEMS AND METHODS FOR LARGE-SCALE LINK ANALYSIS

FIELD OF THE DISCLOSURE

The present disclosure relates generally to data analysis, and particularly to storage and processing of relationship-related information.

BACKGROUND OF THE DISCLOSURE

Various techniques for analyzing and extracting useful information from communication traffic are known in the art. Some analysis techniques process communication traffic in order to identify and characterize relationships between users.

SUMMARY OF THE DISCLOSURE

An embodiment that is described herein provides a method, including:

accepting a plurality of relationship indications based on interaction among entities, each relationship indication specifying that a respective pair of the entities are related;

using a link processor, identifying for each entity among a group of the entities, based on the relationship indications, one or more linked entities that are related to the entity, and constructing a single entity record that indicates all the linked entities that have been identified as being related to the entity;

storing in a memory multiple entity records, each corresponding respectively to one of the entities in the group; and performing, using the link processor, an analytics operation with respect to the entities by querying at least one of the entity records stored in the memory.

In some embodiments, the interaction includes communication among the entities over a communication network. In an embodiment, the entities include at least one entity type selected from a group of types consisting of an individual, a set of individuals, a communication terminal, a plurality of communication terminals, an organization, an e-mail address, a Web-site, a bank account and a home address. In a disclosed embodiment, constructing the single entity record includes storing in the single entity record respective attributes, which characterize respective relationships between the linked entities and the entity. The attributes may indicate respective confidence levels of the relationships.

In an embodiment, storing the entity records includes storing at least a portion of the entity records in an in-memory data structure residing in Random Access Memory (RAM), and performing the analytics operation includes querying the in-memory data structure. Storing the entity records may include storing another portion of the entity records on a magnetic storage device. Performing the analytics operation may include querying at least a first entity record stored in the in-memory data structure and at least a second entity record stored on the magnetic storage device.

In another embodiment, performing the analytics operation includes identifying a shortest sequence of interrelated entities that relate a first entity with a second entity, and acting upon the identified sequence. Additionally or alternatively, one or more of the entities are identified as targets-of-interest, and the analytics operation is performed with respect to the targets-of-interest. In some embodiments, performing the analytics operation includes querying the entity records with a query formulated in a graph query language.

There is additionally provided, in accordance with an embodiment that is described herein, apparatus, including:

a memory; and a link processor, which is configured to accept a plurality of relationship indications based on interaction among entities, each relationship indication specifying that a respective pair of the entities are related, to identify for each entity among a group of the entities, based on the relationship indications, one or more linked entities that are related to the entity, to construct for each entity in the group a single entity record that indicates all the linked entities that have been identified as being related to the entity, to store in the memory multiple entity records, each corresponding respectively to one of the entities in the group, and to perform an analytics operation with respect to the entities by querying at least one of the entity records stored in the memory.

The present disclosure will be more fully understood from the following detailed description of the embodiments thereof, taken together with the drawings in which:

BRIEF DESCRIPTION OF THE DRAWINGS

FIG. 3 is a diagram that schematically illustrates a data structure for efficient storage of relationship information, in accordance with an embodiment of the present disclosure; and FIG. 4 is a flow chart that schematically illustrates a method for large-scale link analysis, in accordance with an embodiment of the present disclosure.

DETAILED DESCRIPTION OF EMBODIMENTS

Overview

Figure 1:
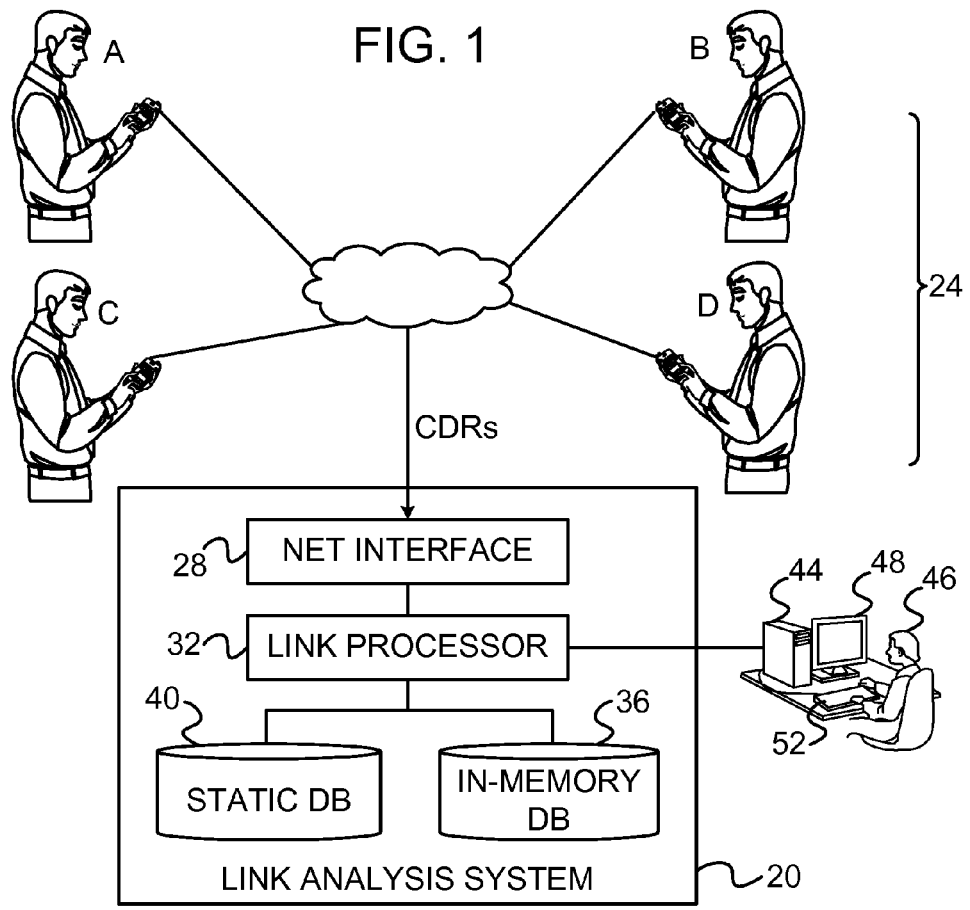
FIG. 1 is a block diagram that schematically illustrates a system for large-scale link analysis, in accordance with an embodiment of the present disclosure.

Some data analytics applications identify relationships among communication network users, and act upon the identified relationships. For example, a fraud detection system may identify a fraudulent user by discovering that this user interacts with other users who are already known as suspects. Changes in relationships (e.g., appearance of a new relationship, or a strengthening or weakening relationship) may also provide meaningful information. Relationships can be identified and characterized, for example, by analyzing communication sessions (e.g., phone conversations) held between the network users.

In many practical cases, identifying and acting upon relationships involves storage and processing of large volumes of data. Tracking relationships among users of a large cellular network, for example, may require processing of billions of Call Detail Records (CDRs) and keeping track of relationships among millions of users. It is possible in principle to represent a set of relationships by a matrix whose dimensions are on the order of the number of users, or as a list of user pairs. These naïve data structures, however, are inefficient to store and query, and quickly become impractical as the number of users and relationships grows. In some practical applications, the storage space and processing time dictated by these data structures limit the achievable system performance.

Embodiments that are described herein provide methods and systems for efficient storage and processing of relationship-related data. In some embodiments, a link analysis system stores and acts upon relationships among entities (e.g., individuals, groups of individuals or even entire organizations). For each entity, the system constructs a single record, which indicates the entities that are related to (i.e., have a relationship with) this entity. In addition to indicating the related entities, a given record may also hold various attributes that characterize the relationships of the related entities with the entity in question.

When using the disclosed techniques, each entity is represented by a single record, and therefore the number of records is on the order of the number of entities. The average record size is on the order of the average number of relationships per entity, which does not change considerably when the number of entities grows. As such, the data structure is highly scalable and is particularly suitable for large-scale applications having large numbers of entities.

The methods and systems described herein are highly efficient in terms of memory requirements. In some embodiments, the small memory space required by the disclosed data structures makes them suitable for in-memory storage (i.e., in Random Access Memory (RAM) rather than on disk). As a result, the data structure can be queried at high speed, and complex queries can be performed at a reasonable run time. In addition to storage efficiency, the data structures described herein lend themselves to efficient execution of analytics operations, since they enable determining the entire set of entities that are related to a given entity in a single query. This capability is a powerful building block, which can be used to construct and execute complex analytics operations with high efficiency. Several example operations are described herein.

System Description

FIG. 1 is a block diagram that schematically illustrates a system 20 for large-scale link analysis, in accordance with an embodiment of the present disclosure. System 20 identifies and acts upon relationships between users of a communication network 24. Systems of this sort can be deployed in various applications, such as fraud detection, anti-money laundering and crime investigation. Other usage examples comprise, for example, Web-page ranking schemes in search engines (e.g., schemes in which each Web-page is ranked based on the ranks of pages that point to it). In the present example, network 24 comprises a cellular network, and the figure shows four users denoted A . . . D. Alternatively, network 24 may comprise any other suitable wire-line or wireless communication network. The network typically serves a large number of users.

Although the embodiments described herein refer mainly to communication between communication network users, the disclosed techniques can be applied to various other kinds of relationships and interactions among entities, e.g., bank transactions, ownerships, kinship and other indications.

System 20 comprises a network interface 28, which receives from network 24 information regarding communication sessions held between the users. In the present example, interface 28 receives Call Detail Records (CDRs) produced in network 24, although any other type of information can also be used (for example e-mail communication or bank transfer records). System 20 further comprises a link processor 32, which carries out the methods described herein. In particular, processor 32 processes the CDRs so as to identify relationships between users, and stores the identified relationships in records and data structures that are described in detail below.

Typically, link processor 32 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

Typically, processor 32 produces records that represent the relationships between entities. These records are sometimes referred to herein as entity records. In some embodiments, the processor stores at least some of the records in an in-memory database 36. Database 36 stores the records in solid state memory, such as Random Access Memory (RAM), thus providing fast access time to the records. Additionally or alternatively, processor 32 may store at least some of the records in a static database 40. Database 40 typically comprises a magnetic storage device, such as a Hard Disk Drive (HDD). In comparison with database 36, database 40 typically provides considerably larger storage space but has a slower access time. In some embodiments, storage of the records is partitioned between the two databases, such as by storing dynamic and/or recent information in the in-memory database, and static and/or older information in static database 40. Processor 32 may transfer records between databases 36 and 40 as desired, for example on a periodic basis.

System 20 interacts with an operator 46 using an operator terminal 44. In particular, system 20 presents output to the operator using an output device such as a display 48, and accepts user input using an input device 52 such as a keyboard or mouse.

The system configuration shown in FIG. 1 is an example configuration, which is shown purely for the sake of conceptual clarity. In alternative embodiments, any other suitable configuration can also be used. For example, the system may comprise only an in-memory database or only a static database. The functions of system 20 may be integrated with various other analytics functions.

Efficient Representation of Relationship Information

In some embodiments, link processor 32 of system 20 analyzes the CDRs received from network 24, so as to produce a set of relationship indications. Each relationship indication specifies a relationship between two entities. An entity may comprise, for example, an individual (e.g., a network user), a group of individuals, a communication terminal (e.g., a cellular phone or a computer), a group of terminals or even an entire organization. Other types of entities may comprise, for example, e-mail addresses, Web-sites, bank accounts or home addresses. Each relationship specifies that a given pair of entities is related. Typically, two entities (e.g., individuals) are regarded as related if the CDRs indicate that they have communicated with one another.

Processor 32 may apply any suitable technique and any suitable criteria for converting the information received from network 24 into a set of relationships. Various techniques for identifying relationships are known in the art, and any such technique can be used by processor 32. Example techniques are described, for example, by Svenson et al., in "Social Network Analysis and Information Fusion for Anti-Terrorism," Proceedings of the Conference on Civil and Military Readiness (CIMI), Enkoping, Sweden, May 16-18, 2006, by Pan, in "Effective and Efficient Methodologies for Social Network Analysis," PhD Thesis submitted to Virginia Polytechnic Institute and State University, Dec. 11, 2007, and by Coffman et al., in "Graph-Based Technologies for Intelligence Analysis," Communications of the ACM (CACM), volume 47, issue 3, March 2004, pages 45-47, which are all incorporated herein by reference.

In alternative embodiments, processor 32 does not generate the relationship indications, but rather receives them from another processor or system.

Generally, relationships may be symmetric (i.e., if entity A is related to entity B then B is necessarily related to A) or asymmetric. A relationship may be defined between entities of the same type (e.g., between two individuals) or between entities of different types (e.g., between an individual and a group of individuals). In some embodiments, processor 32 may assign each relationship one or more attributes. For example, a relationship may be assigned a strength or confidence level. In an example embodiment, entities that communicate frequently may be regarded by processor 32 as having a strong relationship, whereas entities that communicated only once or twice may be regarded as having a weak relationship. As another example, when analyzing bank transactions, the amount of money transferred between two entities may indicate the strength of the relationship. Additionally or alternatively, relationships may be assigned any other suitable attributes.

The set of relationship indications can be represented by a graph, in which nodes represent entities and edges represent relationships.

Figure 2:
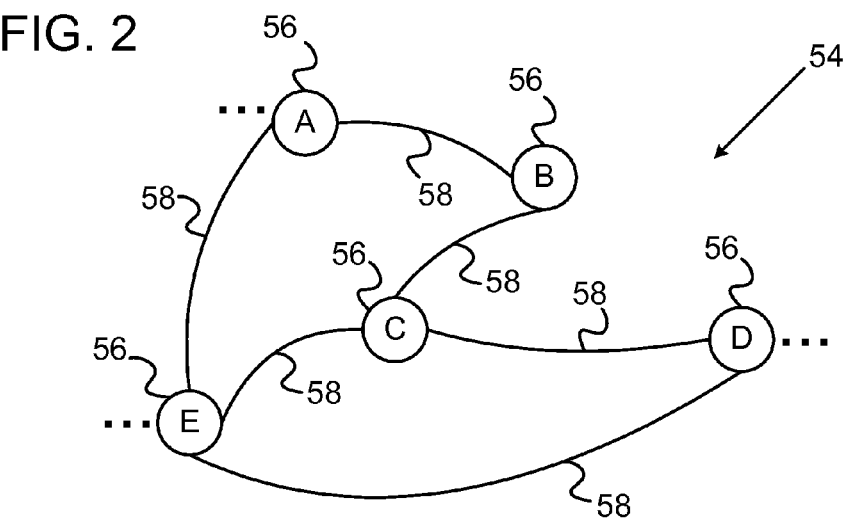
FIG. 2 is a diagram showing a relationship graph, in accordance with an embodiment of the present disclosure.

FIG. 2 is a diagram showing a relationship graph 54, in accordance with an embodiment of the present disclosure. Graph 54 comprises nodes 56 and edges 58. Each node 56 represents an entity (e.g., a network user or user group). An edge 58 between two nodes corresponds to a relationship indication, i.e., specifies a relationship between the corresponding entities. In the present example, the relationships are symmetric, and the graph edges are therefore not directed. The example of FIG. 2 shows a simple graph representing only five entities and six relationships for the sake of clarity. In practice, however, relationship graphs in real-life applications may comprise many millions of entities (nodes) and relationships (edges). For example, a small cellular operator may have over two million subscribers, and over twenty million CDRs per day. A bank may have over 500,000 accounts, and over two million transactions per day.

In some embodiments, processor 32 accepts a relationship graph as input. Alternatively, processor 32 may produce a relationship graph based on CDRs or other information received from network 24.

Processor 32 stores the relationship information in a data structure, which lends itself to efficient storage and subsequent processing. In some embodiments, processor 32 constructs and stores a single record for each entity, referred to as an entity record. The record of a given entity indicates the entities that are related to the given entity. The entities (nodes) related to a given entity (node) are also referred to as linked entities (linked nodes). A given record is typically retrievable in a single read operation.

FIG. 3 is a diagram that schematically illustrates a data structure 60 for efficient storage of relationship information, in accordance with an embodiment of the present disclosure. Data structure 60 comprises multiple records 64. Each entity record 64 corresponds to a respective node 68 in graph 54. In other words, each entity is represented by a single respective record 64 in data structure 60. Each record 64 indicates one or more linked nodes 72 that are linked to the corresponding node 68.

For example, a data structure representing the relationship graph of FIG. 2 would comprise the following five entity records:

A → B, E
B → A, C
C → B, D, E
D → C, E
E → A, C, D

In some embodiments, each linked node 72 may comprise one or more attributes 76, which characterize the relationship in question. The attributes may indicate, for example, the strength or confidence level of the relationship. Attributes may comprise, for example, the number of times the two entities have communicated, the total time duration of the communication, the amount of money that was transferred between two accounts, the days on which the communication took place, or any other suitable attribute.

In some embodiments, certain nodes 68 in data structure 60 may also be assigned one or more attributes, which characterize the node and are not necessarily related to any specific relationship. For example, an attribute may mark whether or not the node is considered a target.

The data structure of FIG. 3 enables storing large numbers of relationships among a large number of entities in a relatively small memory space, in comparison with known schemes. In many cases, data structure 60 is small enough to fit in Random Access Memory (RAM). Thus, in some embodiments, processor 32 stores data structure 60 in in-memory database 36. Since the in-memory database offers fast access time, storing entity records in-memory enables processor 32 to carry out complex analytics operations over the data structure at high speed.

In alternative embodiments, processor 32 stores part of data structure 60 in in-memory database 36, and another part in static database 40. For example, the processor may store new and recently-modified records in the in-memory database, and static or old records in the static database. In these embodiments, analytics operations may involve accessing the in-memory database, the static database, or both.

In addition to storage efficiency, the format of data structure 60 lends itself to efficient execution of analytics operations. In particular, data structure 60 enables processor 32 to retrieve the entire set of entities that are related to an entity-of-interest in a single read operation—by querying the single record representing the entity-of-interest. This capability is a powerful building block, which can be used to construct and execute complex analytics operations with high efficiency.

For example, in many cases certain entities do not have a direct relationship, but are related indirectly via a sequence of (one or more) interrelated entities. In FIG. 2, for example, entity B is not directly related to entity D, but it is indirectly related to it via entity C. In other cases, two entities may be indirectly related via a two of two or more entities. The length of the shortest sequence between two entities is sometimes referred to as the "relationship distance" between the entities. The distance can equivalently be viewed as the number of nodes along the shortest path between the entities in the relationship graph.

Various kinds of analytics operations are concerned with the distances between entities. Some operations are initiated by operator 46. Other operations are carried out automatically by processor 32, such as operations that trigger a notification or alert upon meeting a certain condition defined over the distances. For example, operator 46 may request processor 32 to find the distance between a pair of entities or the shortest distance between a certain entity and a group of target entities. As another example, for a given entity, an analytics operation may identify the targets whose distance to the given entity does not exceed a certain value. The identity of the entities along the shortest path may also be of interest, and may be provided as output.

Calculating relationship distances between entities typically involves traversing the relationship graph (e.g., graph 54 of FIG. 2). In real-life cases, the relationship graph may comprise many millions of nodes and edges, and traversing it may be extremely computationally-intensive. In some embodiments, processor 32 traverses the relationship graph by executing a sequence of queries to data structure 60. Each query returns the entire set of nodes that are linked to the queried node. This sort of query considerably increases the efficiency and speed of traversing the graph. Efficiency and speed are particularly improved when data structure 60 (or at least a considerable portion of the data structure) is stored in in-memory database 36.

In some embodiments, operator 46 may query data structure 60 by formulating a query using a graph query language. When the relationships are represented by a relationship graph, a query of this sort typically returns a sub-graph that matches the query. An example graph query language called GOQL is described by Sheng et al., in "A Graph Query Language and Its Query Processing," Proceedings of the IEEE 15$^{th}$ International Conference on Data Engineering (ICDE), Sydney, Australia, Mar. 23-26, 1999, pages 572-581, which is incorporated herein by reference. Alternatively, any other suitable graph query language can also be used.

FIG. 4 is a flow chart that schematically illustrates a method for large-scale link analysis, in accordance with an embodiment of the present disclosure. The method begins with system 20 receiving, via interface 28, CDRs from communication network 24, at an input step 80. Link processor 32 produces a set of relationship indications between entities (e.g., constructs a relationship graph) from the information conveyed in the CDRs, at a relationship definition step 84. (As noted above, processor 32 may alternatively accept the relationship indications, e.g., in graph format or otherwise, from another system or processor.)

For each entity (graph node), processor 32 produces a single entity record, at a record generation step. The record of a certain entity indicates the entities that are linked (related) to the entity in question. The processor stores the records in in-memory database 36, at a storage step 92. In some embodiments, the processor occasionally transfers static or relatively old records to static database 40.

Processor 32 performs analytics operations on the stored entity records, at an operation step 96. Some example operations have been described above. For some operations, operator 46 provides input (e.g., queries) using input device 52 of terminal 44. Outputs of the operations (e.g., answers to queries) can be displayed to the operator using display 48.

In some embodiments, the process of FIG. 4 continues in a real-time manner. In these embodiments, system 20 continues to receive CDRs, and to update the relationship graph and entity records accordingly.

Although the embodiments described herein mainly address efficient storage and processing of relationship information gathered from communication networks, the principles of the present disclosure can also be used for fraud investigation, anti-money laundering investigation, crime investigation, as well as web-page ranking. Generally, the relationship indications used by the disclosed techniques may be derived from any suitable kind of interaction among entities, not necessarily related to communication sessions.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
accepting a plurality of relationship indications based on interaction among entities, each relationship indication specifying that a respective pair of the entities are related;
using a link processor, identifying for each entity among a group of the entities, based on the relationship indications, one or more linked entities that are related to the entity, and constructing for each entity in the group, a single-entity record that indicates all the linked entities that have been identified as being related to the respective entity;
storing in a memory, multiple single-entity records in a data structure, each single-entity record corresponding respectively to only one of the entities in the group;
identifying one or more of the entities as targets-of-interest; and
performing, using the link processor, an analytics operation with respect to the targets-of-interest by querying at least one of the entity records stored in the memory, the analytics operation comprising determining relationship distances between entities by executing a sequence of queries to the data structure where each query returns the entire set of entities that are linked to the queried entity; wherein storing the entity records comprises storing the entity records in an in-memory data structure residing in Random Access Memory (RAM), and wherein performing the analytics operation comprises querying the in-memory data structure.

2. The method according to claim 1, wherein the interaction comprises communication among the entities over a communication network.

3. The method according to claim 1, wherein the entities comprise at least one entity type selected from a group of types consisting of an individual, a set of individuals, a communication terminal, a plurality of communication terminals, an organization, an e-mail address, a Web-site, a bank account and a home address.

4. The method according to claim 1, wherein constructing the single-entity record comprises storing in the single-entity record respective attributes, which characterize respective relationships between the linked entities and the respective entity.

5. The method according to claim 4, wherein the attributes indicate respective confidence levels of the relationships.

6. The method according to claim 1, wherein storing the entity records comprises storing another portion of the entity records on a magnetic storage device.

7. The method according to claim 6, wherein performing the analytics operation comprises querying at least a first entity record stored in the in-memory data structure and at least a second entity record stored on the magnetic storage device.

8. The method according to claim 1, wherein performing the analytics operation comprises identifying a shortest sequence of interrelated entities that relate a first entity with a second entity, and acting upon the identified sequence.

9. The method according to claim 1, wherein performing the analytics operation comprises querying the entity records with a query formulated in a graph query language.

10. Apparatus, comprising:

a memory; and a link processor, which is configured to accept a plurality of relationship indications based on interaction among entities, each relationship indication specifying that a respective pair of the entities are related, to identify for each entity among a group of the entities, based on the relationship indications, one or more linked entities that are related to the entity, to construct for each entity in the group, a single-entity record that indicates all the linked entities that have been identified as being related to the respective entity, to store in the memory multiple single-entity records in a data structure, each single-entity record corresponding respectively to only one of the entities in the group, identify one or more of the entities as targets-of-interest, and to perform an analytics operation with respect to the targets-of-interest by querying at least one of the entity records stored in the memory, the analytics operation comprising determining relationship distances between entities by executing a sequence of queries to the data structure where each query returns the entire set of entities that are linked to the queried entity; wherein storing the entity records comprises storing the entity records in an in-memory data structure residing in Random Access Memory (RAM), and wherein performing the analytics operation comprises querying the in-memory data structure.

11. The apparatus according to claim 10, wherein the interaction comprises communication among the entities over a communication network.

12. The apparatus according to claim 10, wherein the entities comprise at least one entity type selected from a group of types consisting of an individual, a set of individuals, a communication terminal, a plurality of communication terminals, an organization, an e-mail address, a Web-site, a bank account and a home address.

13. The apparatus according to claim 10, wherein the link processor is configured to store in the single single-entity record respective attributes, which characterize respective relationships between the linked entities and the entity.

14. The apparatus according to claim 13, wherein the attributes indicate respective confidence levels of the relationships.

15. The apparatus according to claim 10, wherein the memory further comprises a magnetic storage device, and wherein the link processor is configured to store another portion of the entity records on the magnetic storage device.

16. The apparatus according to claim 15, wherein the link processor is configured to perform the analytics operation by querying at least a first entity record stored in the in-memory data structure and at least a second entity record stored on the magnetic storage device.

17. The apparatus according to claim 10, wherein the link processor is configured to identify a shortest sequence of interrelated entities that relate a first entity with a second entity, and to act upon the identified sequence.

* * * * *